United States Patent Office
3,752,846
Patented Aug. 14, 1973

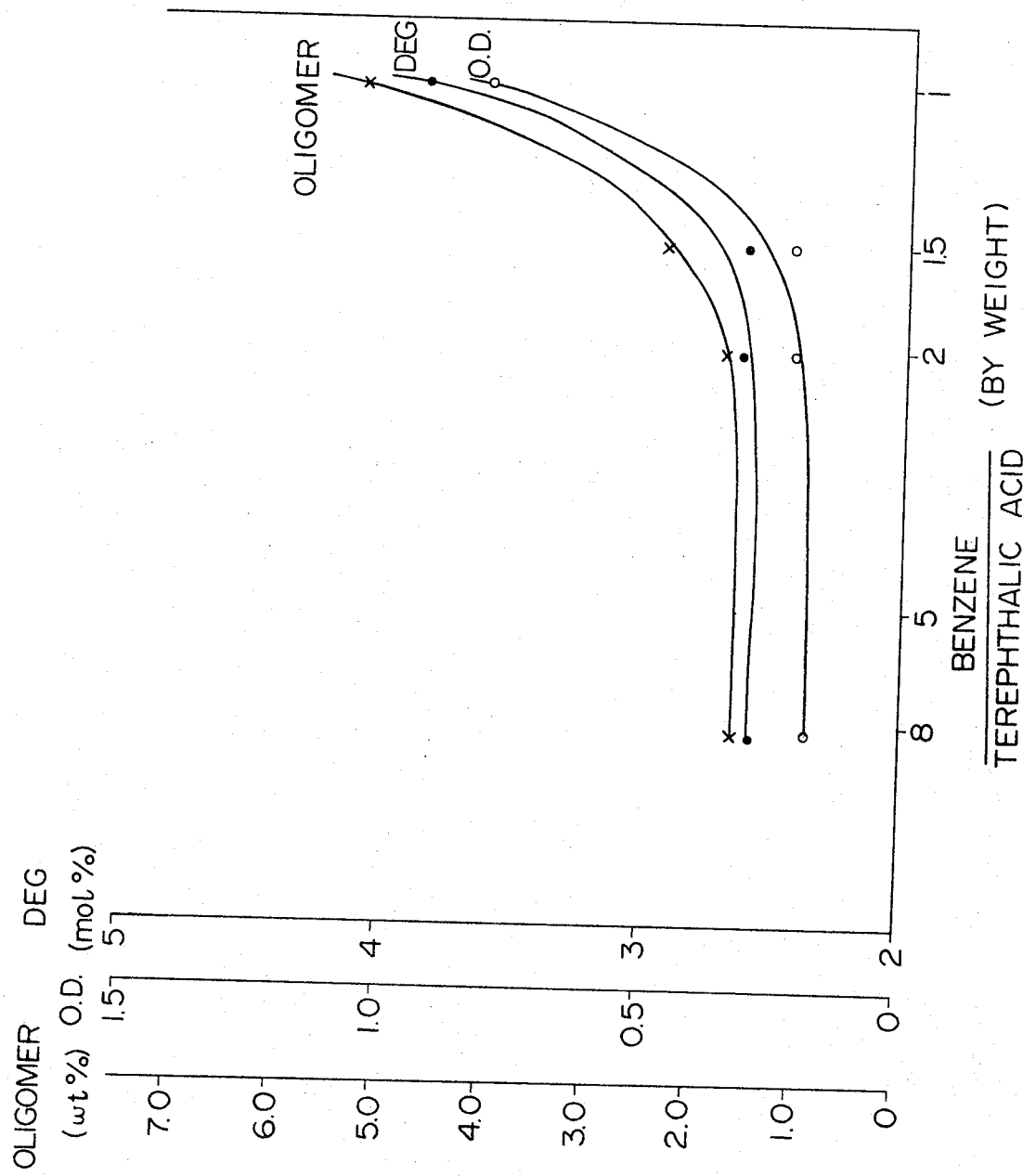

3,752,846
PROCESS FOR PREPARATION OF BIS(β-HYDROXY-ETHYL) TEREPHTHALATE
Yataro Ichikawa and Gentaro Yamashita, Iwakuni, Yuichi Akachi, Ishikawa-ken, and Mutsushi Suzuki and Osamu Kobayashi, Yamaguchi-ken, Japan, assignors to Teijin Limited, Osaka, Japan
Continuation-in-part of abandoned application Ser. No. 737,334, June 17, 1968. This application Aug. 24, 1970, Ser. No. 66,435
Int. Cl. C07c 69/82
U.S. Cl. 260—475 P                     5 Claims

ABSTRACT OF THE DISCLOSURE

Preparation of bis-(β-hydroxyethyl)terephthalate by reacting terephthalic acid with ethylene oxide in an aromatic hydrocarbon medium, i.e. benzene, toluene and xylene, of an amount at least 1.5 times the weight of the terephthalic acid in the presence of an organic base or its salt, such as triethylamine, as a catalyst at a temperature of 150° C. to 230° C. for 1 to 30 minutes, the amount of ethylene oxide being 1.5 to 15 mols per mol of the terephthalic acid. The product has a satisfactory optical density and the amounts of the by-products are reduced. A fiber-forming polyester may be produced from the bis-(β-hydroxyethyl) terephthalate so obtained.

---

This application is a continuation-in-part of copending application Ser. No. 737,334, filed June 17, 1968, now abandoned.

This invention relates to an improved process for the preparation of bis(β-hydroxyethyl) terephthalate.

Bis-(β-hydroxyethyl) terephthalate (may be abbreviated as BHET hereinafter) is of utmost commercial importance as an intermediate for the preparation of polyester fibers or films. Heretofore, BHET has been manufactured on a commercial scale by an ester-interchange reaction between dimethyl ester of terephthalic acid and ethylene glycol or by direct esterification of terephthalic acid with ethylene glycol, and in recent years, the preparation of BHET from terephthalic acid and ethylene oxide has attracted attention.

As a reaction medium in the reaction of terephthalic acid with ethylene oxide, the use of water, halogenated hydrocarbons, ketones, ethers, cyclic ethers, alcohols, amines, esters, organic cyanides, and aliphatic, alicyclic and aromatic hydrocarbons is known.

We have found that at least one aromatic hydrocarbon selected from the group consisting of benzene, toluene and xylene serves well as the reaction medium because it is inert to ethylene oxide; it has no corroding action and does not yield a decomposed substance having a corroding action; the solubility in it of BHET under cold conditions is small and BHET is easily separable from the reaction medium; the use of it gives a reduced tendency to form oligomers such as a dimer or trimer of BHET; and that the coloring of the resulting BHET is to a lesser degree.

Extensive research has been conducted regarding the reaction between terephthalic acid and ethylene oxide in the presence of a catalyst in a medium comprising an aromatic hydrocarbon, and have discovered that the kind of the catalyst, mole ratio of terephthalic acid to ethylene oxide, reaction temperature, reaction time and the amount of aromatic hydrocarbon are closely related to one another, and that a reaction within the range defined by these factors can yield BHET of high quality at a high conversion.

According to the invention, bis - (β - hydroxyethyl) terephthalate free from coloration and containing only tiny amounts of by-products, such as its oligomers and an ester of diethylene glycol and terephthalic acid can be obtained at a high conversion.

According to the present invention, the aforementioned advantages can be achieved by a process for the preparation of bis-(β-hydroxyethyl) terephthalate which comprises reacting terephthalic acid with ethylene oxide in an aromatic hydrocarbon medium selected from the group consisting of benzene, toluene and xylene, characterized in that the reaction is carried out in the presence of an organic base or the salt thereof as a catalyst, and the aromatic hydrocarbon medium in an amount of at least 1.5 times the weight of the terephthalic acid at a temperature of 150° C. to 230° C. for a time period ranging from 1 to 30 minutes, using terephthalic acid and ethylene oxide at a ratio of 1 mol to 1.5–15 mols.

Thus in the present invention, terephthalic acid is reacted with ethylene oxide at a temperature as high as 150 to 230° C. for a period as short as 1 to 30 minutes in the presence of the aromatic hydrocarbon medium in an amount of at least 1.5 times the weight of the terephthalic acid and the organic base or its salt as a catalyst, whereby BHET is produced. The mere reaction of terephthalic acid with ethylene oxide at such a high temperature for such a short period of time results in the coloring of the BHET obtained or the formation of great quantities of by-products such as terephthalic acid derivatives having an ether linkage such as mono- or di-diethylene glycol esters of terephthalic acid or a diethylene glycol ester of mono-β-hydroxyethyl terephthalate, or the oligomers of BHET. However, when the reaction is carried out in the presence of a solvent selected from the group consisting of benzene, toluene and xylene in an amount of at least 1.5 times, preferably at least 2 times, the weight of the terephthalic acid, the resulting BHET has a small degree of coloration and very minor amounts of the by-products mentioned above. Accordingly, the use of such aromatic hydrocarbon solvent in an amount of at least 1.5 times the weight of the terephthalic acid is important in the present invention, and the use of the solvent in an amount of at least about 2 times the weight of the terephthalic acid is preferred. However large the amount of the solvent is, it does not cause any detrimental effect to the reaction, but too great an amount cause a decrease in the effective utilization of the equipment and make it difficult to separate BHET from the reaction mixture economically. Therefore, the use of the solvent in an amount not more than 20 times, especially 10 times, the weight of the terephthalic acid usually suffices.

The above reaction of the present invention can be performed using 1.5 to 15 mols of ethylene oxide per mol of the terephthalic acid. It is preferred that the amount of the aromatic hydrocarbon solvent be increased within the above specified range with increasing amounts of the ethylene oxide. Accordingly, it is advantageous to carry out the reaction of the present invention while adjusting the weight ratio of ethylene oxide/aromatic hydrocarbon solvent to not more than 1, especially not more than 0.7. It is preferred that ethylene oxide be used in an amount of 1.8 to 5 mols, especially 1.8 to 2.4 mols, per mol of the terephthalic acid.

Research has made it clear that even within the range of the above conditions, i.e., reaction temperature, reaction time, the amount of the aromatic hydrocarbon medium for terephthalic acid and mole ratio of ethylene oxide to terephthalic acid, the range of the optimum reaction time is narrow when the reaction temperature is high but is relatively broad when the temperature is low.

With lower reaction temperatures, shorter reaction time and lower molar ratio of ethylene oxide to terephthalic acid in the reaction between terephthalic acid and ethylene oxide, the optical density (may be abbreviated as O.D. hereafter) of BHET and the amounts of the by-products such as the derivatives of terephthalic acid containing an ether linkage and the oligomers of said BHET become smaller but the conversion becomes too low. On the other hand, when the reaction temperature is too high, the reaction time becomes longer, and the ratio of ethylene oxide to terephthalic acid is too high, there is a tendency that the O.D. of BHET and the amount of the by-products become excessively large. The aforementioned defects arising from the large molar ratio of ethylene oxide to terephthalic acid can be avoided by adjusting the weight ratio of ethylene oxide to the aromatic hydrocarbon solvent to not more than 1.0, preferably not more than 0.7, as already stated.

Examination of these reaction conditions individually has revealed that a longer reaction time particularly gives a larger optical density and amounts of oligomers; that the optical density is particularly increased when the reaction temperature gets high.

It has also been found that when the amount of the aromatic hydrocarbon solvent is less than about 2 times, especially less than 1.5 times, the weight of the terephthalic acid, the amounts of the coloring matter (O.D.) of BHET and the by-products mentioned above, particularly diethylene glycol esters of terephthalic acid increase, and therefore the use of such hydrocarbon solvent in an amount of at least 1.5 times the weight of the terephthalic acid is very important and it is preferred to use the ethylene oxide/aromatic hydrocarbon weight ratio of not more than 1, preferably not more than 0.7.

When in the present invention, the reaction time $\theta$ (minutes) is adjusted within the range experssed by the following Formula 1 in relation to the reaction temperature T (° C.) and the molar ratio of ethylene oxide to terephthalic acid (Z), good quality BHET having a small O.D. and small amounts of by-products such as diethylene glycol esters of terephthalic acid can be obtained at high conversion.

$$\exp\left\{g(Z)+\frac{1.596\times10^5}{T+473}-\frac{3.22\times10^7}{(T+273)^2}\right\}$$
$$\leq \theta \leq \exp\left\{f(Z)+\frac{1.096\times10^4}{T+273}\right\}$$
(1)

$g(Z)$ and $f(Z)$ in the Formula 1 are the values obtained from the following formulas.

$$g(Z)=-194.87+0.95\left\{1.068\cdot\exp\left(\frac{Z-1.8}{0.1925}\right)\right.$$
$$\left.-0.06794\cdot\exp\left(-\frac{Z-1.8}{0.01225}\right)\right\}$$

$$f(Z)=-21.82+0.58\left\{1.006\cdot\exp\left(-\frac{Z-1.8}{0.19}\right)\right.$$
$$\left.-0.06356\cdot\exp\left(-\frac{Z-1.8}{0.012}\right)\right\}$$

T in the Formula 1 is a numerical value in the range of 150–230° C., preferably from 160–200° C. Z is a value of 1.5 to 15, preferably from 1.8 to 5. $\theta$ is 1 (minute) at the minimum. The "exp" is an abbreviation of the exponential function.

It is especially important in the present invention to prepare BHET in high yields while restraining the amounts of the coloring component of BHET and the by-products such as esters between diethylene glycol and terephthalic acid.

According to the present invention, it is possible to obtain at a conversion of at least 60% bis-(β-hydroxyethyl) terephthalate in which the increase of an optical density based on the starting terephthalic acid is not more than about 0.3 and which contains less than 4.0 mol percent, preferably less than 3.0 mol percent, of esters of diethylene glycol and terephthalic acid. Furthermore, according to the invention, crude BHET can be obtained at a high conversion by reacting terephthalic acid with ethylene oxide under the above-mentioned conditions, withdrawing the resulting reaction product from a reaction system, maintaining it at a temperature of 85° to 140° C., particularly preferably 90 to 120° C. to thereby separate a heavy liquid phase consisting predominantly of bis-(β-hydroxyethyl) terephthalate from a light liquid phase consisting predominantly of the solvent, and recovering crude bis-(β-hydroxyethyl) terephthalate (BHET) from the heavy phase, thus separating the reaction medium and BHET by a simple procedure. Furthermore, BHET can be obtained by feeding the reaction product into a zone maintained at a temperature at least 10° C. lower than the reaction temperature and above that at which BHET can be in a molten state, to remove unreacted ethylene oxide and part or greater part of the solvent by evaporation, and obtain a mixture containing BHET and unreacted terephthalic acid, thereafter separating unreacted terephthalic acid by a separating procedure such as filtration or centrifugal separation at a temperature above that at which the BHET can be in a molten state and below that at which BHET substantially induces side-reactions. In this case, the distillate removed by evaporation can be directly or after separating the solvent from ethylene oxide, recycled to further reaction. The obtained BHET, if necessary, can further be put to a refining step in liquid state.

A more detailed description of the invention will be given hereinbelow.

In considering the quality of BHET, the color and amounts of derivatives of terephthalic acid containing ether linkages such as esters of diethylene glycol and terephthalic acid contained in said BHET, and further the conversion ratio are important factors. The color of BHET is expressed by its optical density (O.D.) measured at 340 m$\mu$ with a 5 cm. cell with respect to 50 ml. of a solution of 1.5 g. of BHET in pyridine. The color of the crude BHET expressed by O.D., of course, varies according to the degree of coloration of the starting terephthalic acid used. But in the present invention, the increase of O.D. owing to the coloring component formed as by-product in the reaction of terephthalic acid with ethylene oxide can be restricted to about 0.3 at the largest. By so doing, the crude BHET obtained by the process of the invention can be easily purified.

The content of ether linkages, mainly brought about by the incorporation of diethylene glycol in BHET is determined by the following procedure. BHET (0.200 g.), 1.0 ml. of dehydrated and rectified ethanol, and 0.010 g. of tetraethylene glycol dimethyl ether as a standard substance are put into a sealed tube at 230° C. for 8 hours. The obtained ethanol decomposition product is quantitatively determined by using a gas chromatogram (PEG 20 M, column 1 m).

An increase in the content of ether linkages in BHET causes the lowering of a softening point of a polymer obtained by polycondensation of such BHET, which in turn degrades its commercial value. It is therefore desirable that an amount of diethylene glycol in BHET should be less than 4.0 mol percent, preferably less than 3.0 mol percent based on the BHET from which unreacted terephthalic acid has been removed.

The presence of oligomers such as the dimer and trimer in BHET is identified by an infrared spectrum with respect to a dried insoluble matter which has been obtained by refluxing 20 g. of BHET together with 100 ml. of water for 10 minutes, followed by filtration and drying.

Since the presence of oligomers does not adversely affect the polycondensation reaction, the formation of the oligomers as by-products is not as serious a defect as the formation of the coloring component or terephthalic acid derivatives having another linkage.

However, with lesser amounts of the oligomers, the purification of the crude BHET, especially the purification using water, becomes easier. But if an organic solvent is used in the purification of the crude BHET, the crude BHET can be purified to BHET having a quality sufficient to form fiber-grade polyesters even if the crude BHET contains considerable amounts of the oligomers.

Accordingly, the amounts of the oligomers in the crude BHET may be not more than 30% by weight, preferably not more than 20% by weight.

The conversion is calculated from an acid value and a saponification value measured in accordance with a customary manner as follows:

Conversion (percent)
$$= \frac{\text{saponification value} - \text{acid value}}{\text{saponification value}} \times 100$$

Since the low conversion of terephthalic acid causes unreacted terephthalic acid to remain in BHET, it becomes detrimental to the purification of BHET. Or it becomes necessary to recycle it, which constitutes an economical disadvantage. As the rise in conversion leads to an abrupt increase in amounts of the by-product ether linkages and O.D., it is desired that a conversion should be 60–98%, preferably 70–95%.

The process of the invention can be practised both batchwise and continuously, the latter being more advantageous. Any reactor may be used in practising the invention continuously. Since however the reaction time is extremely short in the invention, the use of a tubular reactor is preferable.

According to the present invention, the amount of unconverted terephthalic acid is small. By employing the above-mentioned separating methods, therefore, the unconverted terephthalic acid moves to a phase of molten BHET, and the precipitation of terephthalic acid becomes remarkably slow. Consequently, there is no clogging of pipes owing to the precipitation of the molten BHET. It is thus possible to separate BHET and the reaction medium from the reaction product with ease, and the procedure for recovering the reaction medium becomes exceedingly smooth.

The terephthalic acid used as a starting material in the invention may be produced by any conventional method. For instance, terephthalic acid obtained by oxidation of p-dialkyl benzene, terephthalic acid obtained by the so-called Henkel rearrangement of potassium phthalate or potassium benzoate, or terephthalic acid obtained by chloromethylation and subsequent oxidation of toluene according to the so-called Grosskinsky method is usable.

In practising the process of the invention, any catalyst selected from the group consisting of organic bases and the salts thereof, known heretofore in the reaction between terephthalic acid and ethylene oxide may be used. They include primary amines such as ethyl amine, propyl amine, butyl amine, cyclohexyl amine, and benzyl amine; secondary amines such as diethyl amine, dipropyl amine, dibutyl amine and ethyl propyl amine; tertiary amines such as triethyl amine, tripropyl amine, tributyl amine, dimethylbenzyl amine and diethylbenzyl amine; quaternary ammonium salts such as tetramethylammonium chloride (or bromide), tetraethylammonium chloride (or bromide), trimethylbenzylammonium chloride (or bromide) and triethylbenzylammonium chloride (or bromide), quaternary ammonium hydroxides such as tetramethylammonium hydroxide; phosphines such as triphenyl phosphine and triethyl phosphine; quaternary phosphonium compounds such as tetraethyl phosphonium chloride and tetra-butyl phosphonium hydroxide; arsonium thioethers such as diethyl sulfide; tertiary sulfonium compounds such as triethylsulfonium bromide; arsines such as triphenyl arsine; arsonium compounds such as tetraethyl arsonium bromide, and stibines such as triphenyl stibine. Especially preferable among these catalysts are secondary amines, tertiary amines, quaternary ammonium salts, quaternary ammonium hydroxide and phosphines.

The amounts of these catalysts are preferably at least 0.3% by wgeiht based on the terephthalic acid. There is no upper limit in the amounts of the catalysts with respect to a reaction promoting effect, but is generally 5% by weight in view of the coloring of the obtained BHET.

As the reaction medium, benzene, toluene, xylene, or mixtures of two or more of these can be used. The amount of such medium is at least 1.5 times, preferably about 2 to about 10 times the weight of the terephthalic acid to be used. Benzene is particularly preferred as the reaction medium, because the color tone of BHET obtained by using it as the medium is better than in the case of using toluene or xylene and such BHET is easy to purify. Another reason is that it is easy to recover because of its low boiling point.

The reaction is carried out at a pressure sufficient to maintain most of ethylene oxide as a liquid phase under the reaction temperatures, and generally at a pressure above 5 kg./cm.$^2$.

In the practice of the present invention, water contained in the starting terephthalic acid and benzene may be mixed in the system. But when water is mixed in the starting slurry in an amount above that corresponding to its solubility, terephthalic acid in the starting slurry agglomerates to form a mass, which deposits on the wall surfaces of the reaction vessel in a scale form, becomes a non-uniform slurry, stays in the pipes to cause transportational difficulties or worsens the liquid feeding characteristics of the pump. When the amount of water is especially large, side-reactions occur in the reaction system. For this reason, it is preferred to adjust the amount of water in the slurry to not more than 1% based on the terephthalic acid, above all, not more than the amount corresponding to the solubility of water in benzene.

BHET obtained in accordance with the process of the invention is subjected to a polycondensation reaction in the form as obtained or purified suitably, depending on the purity of terephthalic acid used as a starting material. For instance, if fibre grade high purity terephthalic acid is used, it can be subjected to a polycondensation reaction directly or after having been purified by a simple method such as washing, extraction and re-crystallization. If crude terephthalic acid obtained by oxidation of p-dialkyl benzene is used, it can be subjected to a polycondensation reaction after removing hydroxy ethyl esters of such compounds as p-alkylbenzoic acid or p-carboxybenzaldehyde from the obtained BHET.

Now, the invention will be described by examples, in which all parts are by weight unless otherwise specified.

EXAMPLES 1–3

A slurry consisting of 83 parts of terephthalic acid obtained by air-oxidation of p-xylene in liquid phase (containing 0.74% of p-toluic acid and 0.36% of 4-carboxybenzaldehyde as impurities), 44 parts of ethylene oxide distilled twice, 288 parts of a medium indicated in Table 1 and 0.5 part of triethylamine was continuously fed by a plunger pump into a tubular reactor immersed in a water tank maintained at a temperature 170° C. in an amount of 5.28 parts per minute (average residence time being 20 minutes). The tubular reactor was a pipe with a diameter of 4 mm. and a length of 140 m. The water tank consists of a cylindrical tank equipped with an electrical heater, an opening for water supply and a temperature regulating valve via a cooler condenser. When the temperature within the water tank is below the predetermined temperature, the electric heater is turned on and when it is above the predetermined temperature, the regulating valve is opened to discharge the vapor, whereby the temperature within the vessel is maintained exactly at the predetermined temperature. An outlet of the reaction tube is connected to an intermediate reservoir having a capacity of 1.6 liters, which is then connected to a reaction product receiving tank via a control valve.

The receiving tank is maintained at a pressure of 40 kg./cm.² G in order to maintain unreacted ethylene oxide liquid. The intermediate and reaction product receiving tanks are at a pressure of 40 kg./cm.² G, and normal atmospheric pressure. The contents of the tanks are cooled by a jacket at 120° C. and 20° C.

The reaction product is intermittently withdrawn from the intermediate tank to the receiving tank. The obtained slurry was filtered under pressure, and BHET is separated from the filtrate. The obtained BHET is dried under reduced pressure. The quality and conversion of the BHET are measured, and the results are shown in Table 1.

TABLE 1

| Example | Reaction condition | | | Quality of BHET | | | |
|---|---|---|---|---|---|---|---|
| | Reaction medium | Reaction medium/TA (wt.) | EO/TA (mol) | O.D. (340 mμ) | DEG (mol percent) | Oligomer (wt. percent) | Conversion (mol percent) |
| 1 | Benzene | 3.47 | 2.0 | 0.182 | 2.75 | 1.63 | 86.9 |
| 2 | Toluene | 3.47 | 2.0 | 0.184 | 2.96 | 1.85 | 86.8 |
| 3 | Xylene | 3.47 | 2.0 | 0.219 | 2.92 | 2.72 | 88.1 |

Controls 1–9

The procedures of Examples 1–3 are repeated except the use of reaction mediums indicated in Table 2. The results are also shown in Table 2.

TABLE 2

| Control | Reaction medium | Quality of BHET | | | |
|---|---|---|---|---|---|
| | | O.D. (340 mμ) | DEG (mol percent) | Oligomer (wt. percent) | Conversion (mol percent) |
| 1 | Cyclohexane | 0.43 | 2.70 | 1.43 | 87.2 |
| 2 | n-Heptane | 1.50 | 3.51 | 18.4 | 84.8 |
| 3 | Methylethyl ketone | 0.76 | 2.92 | 24.1 | 92.0 |
| 4 | Methylisobutyl ketone | 0.93 | 3.02 | 25.8 | 92.1 |
| 5 | Ethyl acetate | 0.72 | 2.91 | 24.5 | 93.8 |
| 6 | Dioxane | 0.68 | 2.83 | 0.7 | 91.7 |
| 7 | Isopropyl ether | (¹) | 3.31 | 24.1 | 98.2 |
| 8 | Chloroform | (¹) | 3.10 | 0.8 | 95.2 |
| 9 | Acetone | 0.80 | 2.94 | 23.1 | 94.2 |

¹ 2.0 or more.

EXAMPLES 4–9

Reaction is carried out under the same conditions as in Examples 1–3, except that toluene as a medium, and the conditions indicated in Table 3 are used. The reaction product receiving tank is maintained at a temperature of 95° C. A phase consisting predominantly of BHET is withdrawn from under the receiving tank by decantation, and a phase consisting of predominantly of toluene is taken out from the receiving tank by overflow. The obtained BHET is dried under reduced pressure, and analyzed in the same manner as Examples 1–3. The results are shown in Table 3.

TABLE 3

| Example | Reaction conditions | | | Quality of BHET | | | Conversion (mol percent) |
|---|---|---|---|---|---|---|---|
| | Reaction temperature (° C.) | Amount of slurry fed (parts/min.) | Residence time (min.) | O.D. (340 mμ) | DEG (mol percent) | Oligomer (wt. percent) | |
| 4 | 150 | 4.23 | 25 | 0.170 | 2.25 | <1 | 64.1 |
| 5 | 160 | 4.23 | 25 | 0.177 | 2.57 | <1 | 78.7 |
| 6 | 170 | 10.6 | 10 | 0.162 | 2.29 | <1 | 63.6 |
| 7 | 170 | 7.03 | 15 | 0.169 | 2.56 | <1 | 78.3 |
| 8 | 180 | 10.6 | 10 | 0.178 | 2.62 | <1 | 81.2 |
| 9 | 190 | 21.2 | 5 | 0.172 | 2.46 | <1 | 73.3 |

Controls 10 and 11

The procedures of Examples 1–3 are repeated except that the reaction conditions indicated in Table 4 are employed. The results are shown in Table 4.

TABLE 4

| Control | Reaction conditions | | | Quality of BHET | | | Conversion (mol percent) | Remarks |
|---|---|---|---|---|---|---|---|---|
| | Reaction temperature (° C.) | Amount of slurry fed (parts/min.) | Residence time (min.) | O.D. (340 mμ) | DEG (mol percent) | Oligomer (wt. percent) | | |
| 10 | 140 | 10.6 | 10 | 0.235 | 1.73 | <1 | 18.7 | (¹) |
| 11 | 140 | 5.28 | 20 | 0.206 | 1.81 | <1 | 33.1 | (¹) |

¹ The continuous withdrawal of BHET is impossible because of unreacted terephthalic acid.

EXAMPLES 10–13

The procedures of Examples 4–9 are repeated except that the length of the reaction tube is 70 m. and the reaction conditions indicated in Table 5 are employed. The results are shown in Table 5.

TABLE 5

| Example | Reaction conditions | | | Quality of BHET | | | Conversion (mol percent) |
|---|---|---|---|---|---|---|---|
| | Reaction temperature (° C.) | Amount of slurry fed (parts/min.) | Residence time (min.) | O.D. (340μ) | DEG (mol percent) | Oligomer | |
| 10 | 200 | 13.2 | 4 | 0.183 | 2.62 | <1 | 80.4 |
| 11 | 210 | 21.1 | 2.5 | 0.173 | 2.56 | <1 | 78.8 |
| 12 | 220 | 35.1 | 1.5 | 0.185 | 2.43 | <1 | 72.0 |
| 13 | 230 | 35.1 | 1.5 | 0.177 | 2.52 | <1 | 76.0 |

Control 12

The procedures of Examples 1–3 are repeated except that the same apparatus as used in Examples 10–13 is used and the conditions indicated in Table 6 are employed.

TABLE 6

Reaction conditions:
  Control 12
    Reaction temperature (° C.) _____ 250
    Amount of slurry fed (parts/min.) _____ 21.1
    Residence time (min.) _____ 2.5
Quality of BHET:
    O.D. (340 mµ) _____ 0.9
    DEG (mol percent) _____ 3,12
    Oligomer _____ 15.0
Conversion (mol percent) _____ 99.4

EXAMPLES 15–24

With the use of 83 parts of terephthalic acid used in Examples 1–3, 0.5 part of triethylamine, toluene and ethylene oxide of amounts indicated in Table 9, reaction is carried out by using the same apparatus as in Examples 4–9 at the temperature and with an amount of the slurry fed as indicated in Table 9 below. The other conditions are the same as those in Examples 4–9. The results are also shown in Table 9.

TABLE 9

| Example | Ethylene oxide (part by weight) | EO/TA (mol) | Toluene (part by weight) | Medium TA/(wt.) | Reaction conditions Temperature (° C.) | Amount of slurry fed (part/min.) | Residence time (min.) | Quality of BHET O.D. (340 mµ) | DEG (mol percent) | Oligomer (wt. percent) | Conversion (mol percent) |
|---|---|---|---|---|---|---|---|---|---|---|---|
| 15 | 39.6 | 1.8 | 292.4 | 3.52 | 160 | 5.25 | 20 | 0.171 | 2.32 | <1 | 63.8 |
| 16 | 39.6 | 1.8 | 292.4 | 3.52 | 170 | 8.77 | 12 | 0.170 | 2.42 | <1 | 64.0 |
| 17 | 39.6 | 1.8 | 292.4 | 3.52 | 180 | 15.0 | 7 | 0.179 | 2.28 | <1 | 61.8 |
| 18 | 39.6 | 1.8 | 292.4 | 3.52 | 200 | 21.1 | 5 | 0.192 | 2.56 | <1 | 78.3 |
| 19 | 41.8 | 1.9 | 290.2 | 3.49 | 180 | 10.5 | 10 | 0.174 | 2.53 | <1 | 76.8 |
| 20 | 41.8 | 1.9 | 290.2 | 3.49 | 200 | 26.3 | 4 | 0.182 | 2.51 | <1 | 76.2 |
| 21 | 46.2 | 2.1 | 285.8 | 3.44 | 160 | 5.25 | 20 | 0.173 | 2.23 | <1 | 75.4 |
| 22 | 46.2 | 2.1 | 285.8 | 3.44 | 170 | 10.5 | 10 | 0.169 | 2.36 | <1 | 68.0 |
| 23 | 52.8 | 2.4 | 279.2 | 3.49 | 160 | 5.25 | 20 | 0.187 | 2.73 | <1 | 85.6 |
| 24 | 52.8 | 2.4 | 279.2 | 3.49 | 180 | 12.1 | 5 | 0.170 | 2.34 | <1 | 67.8 |

EXAMPLE 14

The procedures of Examples 4–9 are repeated except that the tubular reactor has a length of 300 m. and the conditions indicated in Table 7 are employed.

EXAMPLES 25 AND 26

With the use of 83 parts of terephthalic acid used in Examples 1–3, 0.5 part of triethylamine, toluene and ethylene oxide, and the same reaction apparatus as used in Example 14, reaction is carried out in the same manner as in Examples 4–9 under the reaction conditions given in Table 10. The results are shown in Table 10.

TABLE 10

| Example | Ethylene oxide (part by weight) | EO/TA (mol) | Toluene (part by weight) | Medium TA/(wt.) | Reaction conditions Temperature (° C.) | Amount of slurry fed (part/min.) | Residence time (min.) | Quality of BHET O.D. (340 mµ) | DEG (mol percent) | Oligomer (wt. percent) | Conversion (mol percent) |
|---|---|---|---|---|---|---|---|---|---|---|---|
| 25 | 41.8 | 1.9 | 290.2 | 3.49 | 150 | 7.52 | 30 | 0.182 | 1.76 | <1 | 64.4 |
| 26 | 41.8 | 1.9 | 290.2 | 3.49 | 160 | 7.52 | 30 | 0.177 | 2.61 | <1 | 80.8 |

TABLE 7

Reaction conditions:
  Example 14
    Reaction temperature (° C.) _____ 150
    Amount of slurry fed (part/min.) _____ 7.54
    Residence time (min.) _____ 30
Quality of BHET:
    O.D. (340 mµ) _____ 0.170
    DEG (mol percent) _____ 2.34
    Oligomer (wt. percent) _____ Less than 1
Conversion (mol percent) _____ 67.2

Comparative Examples 13 and 14

Reaction is carried out in the same manner as in Example 14 with the use of the same terephthalic acid used in Examples 1–3 and the same apparatus as used in Example 14 under the reaction conditions indicated in Table 8. The results are shown in Table 8.

Control 15

With the use of 83 parts of terephthalic acid used in Examples 1–3, 0.5 part of triethylamine, toluene and ethylene oxide of amounts given in Table 11, reaction is carried out in the same manner as in Examples 25 and 26. The results are shown in Table 11.

TABLE II

Reaction conditions:
  Control 15
    Ethylene oxide (parts by weight) _____ 46.2
    Toluene (parts by weight) _____ 285.8
      Temperature (° C.) _____ 170
      Amount of slurry fed (part/min.) ____ 6.43
      Residence time (min.) _____ 35
    Quality of BHET:
      O.D. (340 mµ) _____ 0.410
      DEG (mol percent) _____ 3.46
      Oligomer (wt. percent) _____ 7.2
    Conversion (mol percent) _____ 99.8

TABLE 8

| Comparative example | Reaction conditions Reaction temperature (° C.) | Amount of slurry fed (part/min.) | Residence time (min.) | Quality of BHET O.D. (340µ) | DEG (mol percent) | Oligomer (wt. percent) | Conversion (mol percent) | Remark |
|---|---|---|---|---|---|---|---|---|
| 13 | 140 | 6.45 | 35 | 0.186 | 2.02 | <1 | 47.0 | (¹) |
| 14 | 160 | 4.10 | 55 | 0.8 | 3.55 | 7.0 | 99.6 | |

* The continuous withdrawal of BHET is impossible because of unreacted terephthalic acid.

EXAMPLE 27

Reaction is carried out in the same manner as in Examples 4–9 except the following: reaction temperature, 170° C.; amount of slurry fed, 7.03 parts/min. (residence time being 15 minutes); medium, benzene; temperature of a reaction product receiving tank, 90° C.; and the pressure, saturated vapour pressure. In the reaction product receiving tank, the liquid is separated into two layers, and from the lower layer, a product predominantly comprising BHET is obtained. The results of analysis are: conversion, 78.2%; DEG 2.56%; O.D., 0.151. During the operation over a period of one week, no trouble such as the solidification of the product or the clogging of the apparatus occurs.

EXAMPLE 28

The procedures of Example 27 are repeated except that xylene is used as the medium, and the reaction product receiving tank is maintained at 95° C. The results of analysis of the product obtained from the lower layer are: conversion 81.2%; DEG 2.67%; and O.D., 0.173. During the four days' operation, no trouble such as the solidification of the product or the clogging of the apparatus occurs.

EXAMPLE 29

A mixing vessel was charged with 166 parts of terephthalic acid obtained by liquid phase air oxidation of p-xylene (containing 0.91% of 4-carboxybenzaldehyde, 0.23% of p-toluylic acid, 70 p.p.m., calculated as metal, of cobalt compound, 0.05% of water, and 0.02% of other substances), 408 parts of benzene and 1.0 part of triethylamine, followed by thorough stirring to form a slurry. The slurry was mixed by means of a plunger pump with ethylene oxide fed by another plunger pump, immediately before the reactor, and the mixture was fed into the reactor. The amount of ethylene oxide was 2.2 mols per mole of the terephthalic acid. The reactor used consisted of a plurality of groups of substantially straight pipes made of stainless steel (SUS 32) and having an inner diameter of 6 mm. aligned in one substantially horizontal plane and connected with one another in series by a curved pipe, the groups being connected in series by a curved pipe, and was used as immersed in a water tank maintained at 187° C. The residence time of the reaction mixture in the reactor was 10 minutes. One end of the reactor was connected to an intermediate reservoir having a capacity of 3 liters to which a flush tank was connected via a control valve. The intermediate reservoir was pressurized to 25 kg./cm.$^2$ G with nitrogen gas to maintain benzene and ethylene oxide liquid. The temperature of the intermediate reservoir was 160° C., and the flush tank was maintained at 110° C. and 1.5 kg./cm.$^2$ G.

From the reaction product flushed to the flush tank, most of the benzene and unreacted ethylene oxide were evaporated and gathered in a benzene receiving tank in a condensed form. A slurry was made in the mixing tank from these materials together with fresh terephthalic acid and unreacted terephthalic acid, and recycled to the reaction. The non-volatile matter remaining in the flush tank and consisting mainly of BHET and unreacted terephthalic acid was intermittently fed to a pressurized filter, and the liquid BHET was separated from unreacted solid terephthalic acid. The temperature of the pressurized filter was 113° C., and its pressure was 1.2 kg./cm.$^2$ G. The liquid BHET was cooled by means of a flaker, and collected as flakes. The cake gathered at the pressurized separator was washed with benzene heated at about 110° C., withdrawn and recycled to the reaction. The conversion of terephthalic acid calculated from the amount of the unreacted terephthalic acid was 96.3%. The BHET in the form of flakes contained 2.45 mol percent of diethylene glycol and 2.5% by weight of oligomers, and was found to have an O.D. of 0.183.

EXAMPLES 30 TO 32 AND CONTROLS 16 TO 18

A slurry consisting of 83 parts of high purity terephthalic acid, 44 parts of ethylene oxide (corresponding to 2 molar times the amount of the terephthalic acid) subjected to simple distillation twice, benzene of the amount indicated in Table 12, and 0.5 part of triethylamine was put into an autoclave, and reacted at temperatures and for periods indicated in Table 12. Benzene and unreacted ethylene oxide were evaporated from the crude BHET at reduced pressure. One hundred parts of water was added to 30 parts of the crude BHET and the mixture heated to 80° C. to dissolve BHET. The unreacted terephthalic acid was separated by filtration. The filtrate was cooled to 2–4° C. to precipitate BHET. Purified BHET was obtained after filtration and washing procedures. The BHET obtained (127 parts), 0.0395 part of antimony trioxide and 0.014 part of trimethyl phosphate were put into a flask, and after thorough purging with $N_2$, were polycondensed for 20 minutes at 285° C. and atmospheric pressure, for 30 minutes at 20 mm. Hg, and for 60 minutes at 0.2 mm. Hg or less. The quality of the resulting polyethylene terephthalate (PET) is shown in Table 12.

TABLE 12

| | Reaction condition | | | | Quality of BHET | | | Quality of PET | | | | | |
|---|---|---|---|---|---|---|---|---|---|---|---|---|---|
| | Weight ratio of medium to TA | Temperature (° C.) | Time (min.) | Conversion mol percent | O.D. | DEG (mol percent) | Oligomer (wt. percent) | Color L | a | b | $[\eta]$ | SP (° C.) | Remark |
| Example: | | | | | | | | | | | | | |
| 30 | 8.46 | 180 | 16 | 88.9 | 0.186 | 2.58 | 1.62 | 85.6 | −0.8 | −3.2 | 0.659 | 262.7 | |
| 31 | 2.02 | 180 | 10 | 89.0 | 0.201 | 2.62 | 1.73 | 83.7 | −0.7 | −4.3 | 0.660 | 262.4 | |
| 32 | 1.5 | 180 | 6 | 87.0 | 0.205 | 2.61 | 2.30 | 85.6 | −0.5 | −3.6 | 0.644 | 262.1 | |
| Control: | | | | | | | | | | | | | |
| 16 | 0.903 | 180 | 6 | 90.2 | 0.807 | 3.85 | 5.23 | 66.9 | −1.9 | 7.1 | 0.645 | 261.5 | * |
| 17 | 0.5 | 180 | | | | | | | | | | | * |
| 18 | 0.5 | 150 | | | | | | | | | | | * |

In the table, the intrinsic viscosity ($\eta$) was calculated from the value measured at 35° C. using o-chlorophenol as a solvent. The color of the polymer was measured by a Hunter difference meter, and larger L values indicate greater brightness. With increasing b values, the color becomes more yellowish, and larger a values indicate increasing reddish color. The Sp (° C.) is the oftening point of PET. The asterisks indicate that the reaction went too far, and it was impossible to control the temperature.

It is seen from Table 12 and the drawing obtained by plotting the results that when the weight ratio of the reaction medium to terephthalic acid was 0.5, the temperature control was impossible, and the temperature rose near to 250° C. owing to the heat of reaction, and therefore that the reaction mixture was colored and BHET was substantially unobtainable. When the weight ratio of the reaction medium to terephthalic acid was 0.963, the reaction could be performed, but the resulting BHET had very inferior quality, and polyethylene terephthalate obtained by polymerizing such BHET was very unsatisfactory in color. In contrast, when the weight ratio of the reaction medium to terephthalic acid was 1.5 or more, the resulting BHET was of very high quality, and polyethylene terephthalate obtained by polymerizing it had satisfactory color.

EXAMPLES 33 to 39

A slurry consisting of 83 parts of high purity terephthalic acid, 44 parts of ethylene oxide (corresponding to 2 molar times the amount of the terephthalic acid) subjected twice to simple distillation, benzene of the amount indicated in Table 13 and 0.5 part of triethylamine was put into an autoclave, and reacted at the temperatures and the periods indicated in Table 13. The reaction product was cooled, withdrawn, and filtered to separate the resulting crude BHET. The crude BHET was dried under reduced pressure, and recrystallized from water in the same manner as in Examples 30 to 32. The resulting BHET was polycondensed. The results obtained are shown in Table 13.

TABLE 13

| | Reaction condition | | | | Quality of BHET | | | Quality of PET | | | | |
|---|---|---|---|---|---|---|---|---|---|---|---|---|
| Example | Weight ratio of medium to TA | Temp. (° C.) | Time (min.) | Conversion (mol percent) | O.D. | DEG (mol percent) | Oligomer (weight percent) | Color L | a | b | [η] | Sp (° C.) |
| 33 | 8.46 | 200 | 4 | 89.3 | 0.203 | 1.00 | 1.52 | 85.7 | −0.7 | −3.6 | 0.665 | 261.8 |
| 34 | 8.46 | 220 | 3 | 89.8 | 0.224 | 1.13 | 1.04 | 85.6 | −0.7 | −3.6 | 0.686 | 262.7 |
| 35 | 2.02 | 200 | 3 | 87.8 | 0.211 | 1.25 | 1.43 | 85.2 | −0.8 | −4.4 | 0.661 | 263.3 |
| 36 | 2.02 | 220 | 2 | 89.8 | 0.216 | 1.27 | 1.58 | 83.8 | 0 | −4.4 | 0.652 | 262.5 |
| 37 | 1.5 | 150 | 30 | 86.7 | 0.180 | 2.15 | 1.27 | 85.7 | −0.7 | −3.3 | 0.681 | 262.6 |
| 38 | 1.5 | 200 | 2.5 | 86.8 | 0.206 | 1.38 | 2.46 | 86.0 | −0.7 | −3.8 | 0.643 | 262.4 |
| 39 | 1.5 | 220 | 1.5 | 88.5 | 0.128 | 1.53 | 2.73 | 86.7 | 0.7 | −2.6 | 0.650 | 263.1 |

It is seen from the results shown in Table 13 that when the weight ratio of the reaction medium to terephthalic acid is at least 1.5 and the reaction temperature and time are within the ranges specified in the present invention, both the quality of BHET and that of PET are superior.

a high diethylene glycol content. When triethylamine is used as the catalyst in an aqueous medium, the conversion of terephthalic acid is low, and the conversion of ethylene oxide to ethylene glycol is high. On the other hand, when benzene is used as the solvent and an inorganic base such as sodium hydroxide as the catalyst, it is hardly possible to obtain BHET.

EXAMPLES 40 TO 49

A slurry consisting of 83 parts of high purity terephthalic acid, 0.5 part of triethylamine, and ethylene oxide subjected twice to simple distillation and benzene of the amounts indicated in Table 15 was put into an autoclave, and maintained at the temperature and period indicated in Table 15. The reaction mixture was separated by filtration, and the resulting crude BHET was recrystallised from water. The resulting BHET was polycondensed to form polyethylene terephthalate. The results obtained are shown in Table 15.

TABLE 15

| | Reaction condition | | | | | Quality of crude BHET | | | Quality of PET | | | | |
|---|---|---|---|---|---|---|---|---|---|---|---|---|---|
| Example | EO/TA (mol) | Medium/ TA (wt.) | Temp. (° C.) | Time (min.) | Conversion (mol percent) | O.D. | DEG (mol percent) | Oligomer (wt. percent) | Color L | a | b | [η] | Sp (° C.) |
| 40 | 1.5 | 1.5 | 150 | 30 | 63.1 | 0.192 | 2.54 | 1.51 | 86.2 | −0.6 | −3.7 | 0.651 | 261.8 |
| 41 | 1.5 | 3.47 | 170 | 25 | 67.5 | 0.183 | 2.48 | 1.28 | 86.1 | −0.6 | −3.7 | 0.652 | 262.8 |
| 42 | 1.5 | 3.47 | 190 | 10 | 70.1 | 0.191 | 2.51 | 2.41 | 86.8 | −0.5 | −3.4 | 0.638 | 263.0 |
| 43 | 1.5 | 10 | 230 | 3 | 69.8 | 0.224 | 2.65 | 3.48 | 84.5 | −0.8 | −3.2 | 0.663 | 262.5 |
| 44 | 3 | 1.5 | 160 | 13 | 92.3 | 0.196 | 2.63 | 1.48 | 83.8 | −1.2 | −3.8 | 0.657 | 261.4 |
| 45 | 3 | 10 | 200 | 2 | 89.8 | 0.223 | 2.62 | 2.27 | 82.8 | −1.0 | −4.3 | 0.681 | 262.2 |
| 46 | 4 | 2 | 190 | 2 | 92.2 | 0.224 | 2.45 | 2.17 | 86.4 | −0.8 | −3.9 | 0.659 | 262.8 |
| 47 | 4 | 5 | 170 | 4 | 88.1 | 0.205 | 2.31 | 2.38 | 86.5 | −0.8 | −3.9 | 0.655 | 262.3 |
| 48 | 5 | 2 | 150 | 10 | 85.0 | 0.195 | 2.46 | 1.74 | 85.4 | −0.8 | −3.4 | 0.665 | 263.4 |
| 49 | 5 | 5 | 160 | 6 | 86.1 | 0.178 | 2.33 | 1.55 | 84.0 | −1.1 | −3.4 | 0.667 | 263.1 |

CONTROLS 19 TO 21

High purity terephthalic acid, the reaction medium and catalyst indicated in Table 14 were put into an autoclave, and heated at a temperature about 15° C. lower than that indicated in Table 14. Thereafter liquid ethylene oxide of the ratio indicated was charged, when owing to the heat of reaction, the temperature rose to the value indicated in Table 14. The reaction mixture was maintained for the period indicated, and rapidly cooled. Crude BHET obtained by filtration was recrystallized from water in the same manner as set forth in Examples 30 to 32, and polycondensed. The results obtained are shown in Table 14.

It is seen from the results shown in Table 15 that when the mol ratio of ethylene oxide to terephthalic acid is in the range of 1.5–5 or more, high quality BHET can be obtained at a high conversion if the weight ratio of the reaction medium to terephthalic acid, the reaction temperature and the reaction time are adjusted within the ranges specified in the present invention, and that polyethylene terephthalate obtained by polymerizing said BHET was of very excellent quality.

What is claimed is:

1. A process for the preparation of bis-(β-hydroxyethyl) terephthalate which comprises reacting terephthalic

TABLE 14

| | Reaction condition | | | | | | Quality of crude BHET | | | Quality of PET | | | | | Conversion of ethylene oxide to ethylene glycol |
|---|---|---|---|---|---|---|---|---|---|---|---|---|---|---|---|
| Control | ED/TA (mol) | Medium/ TA (wt.) | Catalyst (mol) | Temp. (° C.) | Time (min.) | Conversion (mol percent) | O.D. | DEG (mol percent) | Oligomer (wt. percent) | Color L | a | b | [η] | Sp (° C.) | |
| 19 | 2.17 | Water 1.81 | NaOH 0.169 | 180 | 2.5 | 79.6 | >2 | 4.60 | 0.0 | 81.2 | −1.1 | 5.6 | 0.651 | 261.8 | 31.3 |
| 20 | 2.17 | *1.81 | TEA 0.169 | 180 | 10 | 55.7 | 0.228 | 1.07 | 0.0 | 81.7 | −0.4 | 0.7 | 0.658 | 262.2 | 47.5 |
| 21 | 2.0 | Benzene 2.51 | NaOH 0.169 | 180 | 10 | 1.0 | 0.160 | 0.0 | 0.0 | | | | | | 0.0 |

NOTE.—TEA stands for triethylamine.

It is clear from the results given in Table 14 that when water is used as the medium and NaOH as the catalyst, the conversion of ethylene oxide to ethylene glycol was very high, and the resulting BHET had a large O.D. and acid with ethylene oxide in a ratio of 1 mol of the terephthalic acid to 1.5–15 mols of the ethylene oxide, said reaction being carried out in the presence of 0.3 to 5% by weight, based on the terephthalic acid, of a catalyst selected from the group consisting of secondary amines, tertiary amines, quaternary ammonium salts, quaternary ammonium hydroxides and phosphines in 1.5 to 20 times the weight of the terephthalic acid of an aromatic hydrocarbon medium selected from the group consisting of benzene, toluene and xylene at a temperature of 160° C. to 200° C. for a time ($\theta$ in minute), $\theta$ being defined by the following equation but within the range of 1 to 30 minutes:

$$\exp\left\{g(Z)+\frac{1.596\times 10^5}{T+273}-\frac{3.22\times 10^7}{(T+273)^2}\right\}$$
$$\leq \theta \leq \exp\left\{f(Z)+\frac{1.096\times 10^4}{T+273}\right\}$$

wherein $g(Z)$ and $f(Z)$ are calculated from the following formulas:

$$g(Z)=-194.87+0.95\left\{1.068\cdot\exp\left(-\frac{Z-1.8}{0.1925}\right)\right.$$
$$\left.-0.06794\cdot\exp\left(-\frac{Z-1.8}{0.01225}\right)\right\}$$

$$(Z)=-21.82+0.58\left\{1.066\cdot\exp\left(-\frac{Z-1.8}{0.19}\right)\right.$$
$$\left.-0.06356\cdot\exp\left(-\frac{Z-1.8}{0.012}\right)\right\}$$

wherein Z is the molar ratio of ethylene oxide to terephthalic acid and T is the reaction temperature in 0° C.

2. The process of claim 1 wherein the reaction is carried out for a period of from 3 to 20 minutes.

3. The process of claim 1 wherein the reaction is carried out in the presence of said aromatic hydrocarbon medium in an amount of about 2 to about 10 times by weight of said terephthalic acid.

4. The process of claim 1 wherein the molar ratio of terephthalic acid to ethylene oxide is 1:1.8–5.

5. The process of claim 1 wherein the reaction medium is benzene.

References Cited

UNITED STATES PATENTS

| | | | |
|---|---|---|---|
| 3,590,070 | 6/1971 | Martin et al. | 260—475 P |
| 3,052,711 | 9/1962 | Glogau et al. | 260—475 P |
| 3,576,841 | 4/1971 | Larkin | 260—475 P |
| 3,461,154 | 8/1969 | Lafont et al. | 260—475 P |

FOREIGN PATENTS

| | | | |
|---|---|---|---|
| 1,466,001 | 12/1966 | France | 260—475 P |

LORRAINE A. WEINBERGER, Primary Examiner

E. J. SKELLY, Assistant Examiner

U.S. Cl. X.R.

260—75 M

UNITED STATES PATENT OFFICE
CERTIFICATE OF CORRECTION

Patent No. 3,752,846          Dated August 14, 1973

Inventor(s) Yataro ICHIKAWA and Gentaro YAMASHITA

It is certified that error appears in the above-identified patent and that said Letters Patent are hereby corrected as shown below:

Column 15, line 22: delete the equation and insert $$\text{--}f(Z) = -21.82 + 0.58 \left\{ 1.066 \cdot \exp\left(-\frac{Z-1.8}{0.19}\right) \text{--}\right.$$

Signed and sealed this 18th day of December 1973.

(SEAL)
Attest:

EDWARD M. FLETCHER, JR.          RENE D. TEGTMEYER
Attesting Officer                 Acting Commissioner of Patents